United States Patent [19]

Bethge et al.

[11] 4,209,687

[45] Jun. 24, 1980

[54] LAMINATED TRANSPARENT PANE

[75] Inventors: Walther Bethge; Dietrich Bethge, both of Riehen, Switzerland

[73] Assignee: Therglas GmbH für Flächenheizung, Riehen, Switzerland

[21] Appl. No.: 870,416

[22] Filed: Jan. 18, 1978

[30] Foreign Application Priority Data

Jan. 27, 1977 [CH] Switzerland ............... 1044/77

[51] Int. Cl.² ............................................. H05B 3/06
[52] U.S. Cl. ........................... 219/522; 219/203; 219/345; 219/544
[58] Field of Search ............... 219/203, 213, 345, 522, 219/544, 545, 547, 552, 553; 13/22, 25, 31, 214; 338/253

[56] References Cited

U.S. PATENT DOCUMENTS

| | | | |
|---|---|---|---|
| 2,030,117 | 2/1936 | Page | 219/522 X |
| 2,195,705 | 4/1940 | Morgan | 338/253 X |
| 2,813,960 | 11/1957 | Egle et al. | 219/345 |
| 3,206,923 | 9/1965 | Price | 219/552 X |
| 3,409,759 | 11/1968 | Boicey et al. | 219/522 |
| 3,420,986 | 1/1969 | Pohler et al. | 219/553 |
| 3,729,616 | 4/1973 | Gruss et al. | 219/522 |
| 3,745,309 | 7/1973 | Gruss | 219/522 |
| 3,789,192 | 1/1974 | Spindler | 219/522 |
| 3,792,232 | 2/1974 | Zarenko | 219/522 |
| 3,859,506 | 1/1975 | Weckstein | 219/552 |
| 3,903,396 | 9/1975 | Boaz | 219/547 |

FOREIGN PATENT DOCUMENTS

| | | | |
|---|---|---|---|
| 876874 | 5/1953 | Fed. Rep. of Germany | 219/345 |
| 907971 | 4/1954 | Fed. Rep. of Germany | 219/345 |
| 935986 | 12/1955 | Fed. Rep. of Germany | 219/522 |
| 1615130 | 12/1970 | Fed. Rep. of Germany | 219/522 |

*Primary Examiner*—Volodymyr Y. Mayewsky
*Attorney, Agent, or Firm*—Kenway & Jenney

[57] ABSTRACT

A laminated transparent pane, such as a car window, has a plurality of conducting wires embedded in it for heating the pane to prevent condensation. These wires are provided in a central lamination in the pane and are twisted into spiral form.

9 Claims, 4 Drawing Figures

LAMINATED TRANSPARENT PANE

FIELD OF THE INVENTION

This invention relates to transparent panes of laminated construction with a fine wire insert, and in particular to heated panes. Such panes are necessary for the prevention or elimination of condensation and/or ice accretion. Vision through such panes should be unimpaired by the wire insert.

BACKGROUND OF THE INVENTION

Known heated panes contain a heating field consisting of a plurality of thin wires which are electrically connected within the pane, and near the edge thereof, to flat supply leads which are connected to a current source to enable the pane to be heated. Spectral splitting and brightness in the field of vision due to diffraction of the light at the plurality of non-reflecting fine wires should not impair vision in such a case. For good heating efficiency, the surface of the heated pane should be uniformly warmed, without the field of view becoming disturbed due to striation of the film. The conditions under which a heated pane may be uniformly heated at its surface to prevent optical distortion are sufficiently known from German specification No. 15 16 130 of 27.1.1967. In German Pat. No. 876 874 of 6.3.1951, it has already been suggested how the splitting of light due to the glitter effect of a plurality of parallel fine wires can be substantially reduced without the viewing conditions being impaired. According to this patent, the heating wires should be disposed in an undulating manner along their main direction parallel to the surface of the pane. In order to obtain optimum conditions the direction of the heating wire undulations should progressively and uniformly increase and decrease between 0° and 90°. This cannot be attained with available technical resources, and all the more so because even on this basis, fundamental limits are set on the possibility of eliminating the appearance of diffraction. In the most satisfactory case, the heating wires can be laid in approximately sinusoidal trailing curves, which give rise to the appearance of segment-like brightness in the field of vision.

SUMMARY OF THE INVENTION

The object of the present invention is to provide an arrangement of heating wires by which the appearance of diffraction can be prevented to a much greater extent than previously. This is attained according to the invention in that the heating wires are disposed in the form of elongated spirals spaced apart in the heating field with their axis parallel to the surface of the pane. In contrast to the previous two-dimensional undulated arrangement of the heating wires in a plane parallel to the surface of the pane, the heating wires are in this case wound spatially in the form of spirals along their axes, which extend parallel to the surface of the pane. When viewed through the pane, the elongated heating wire spirals appear as sine curves. The heating field formed from a plurality of such heating wire spirals disposed side-by-side is embedded in the intermediate film of the laminated glass pane in such a manner that each individual turn of the wire spiral is in local heat conducting contact at least with the inner side of one of the two cover panes. For this purpose, the turn diameter is made equal to, or slightly greater than the film thickness, or equal to a fraction of the intermediate film thickness. When viewed in the axial direction, the turns of the wire spiral do not have to be round. They may also be oblate or flat. To this end, the rise/extension of any turn of the wire spiral should not be smaller than its turn diameter, and at most a few turn diameters. Neighbouring wire spirals, on account of their axes being disposed parallel to the pane surface, are also normally parallel to each other. However, they can also be spread apart from each other trapezoidally without then being restricted in adapting the specific heating capacity to the local requirement, if this is important. The wire spirals can also be disposed meander-shaped or undulated in the axial direction. In a further embodiment of the invention, stranded wires previously twisted from several single wires may be used instead of single wires for the wire spirals. The wire spirals can also consist of two or more single wires extending parallel to each other spaced apart.

One embodiment of the invention, illustrated on the accompanying drawing, is described in greater detail hereinafter.

DETAILED DESCRIPTION OF THE PREFERRED EMBODIMENT

Figure 1:
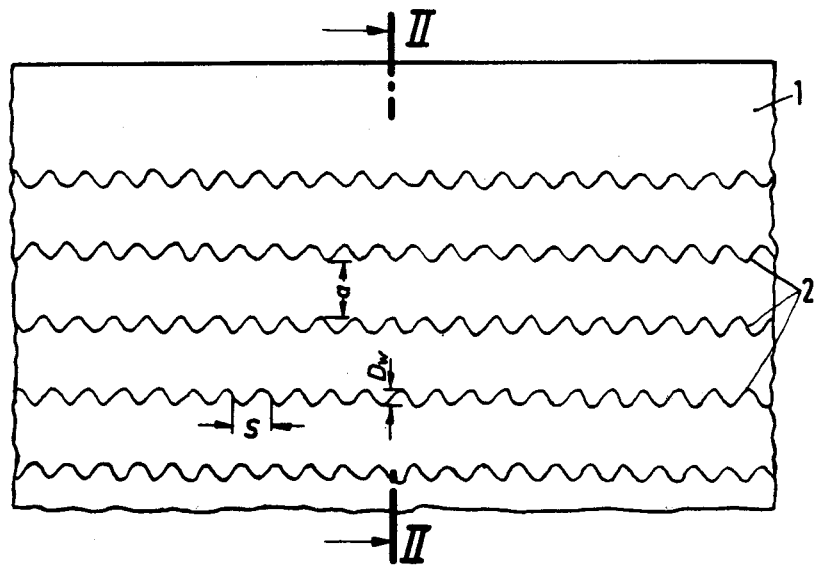
FIG. 1 of the drawing is a plan view of a portion of a heated pane without its edge part, magnified about ten times.

The portion of heated pane 1 shown in FIG. 1 of the drawing without its edge part contains an arrangement, magnified about ten times, of heating wire spirals 2 of fine wire with a diameter $D_f$ of 0.02 mm, the turn diameter $D_w$ of which is 0.3 mm, and which are extended a distance S equal to twice the turn diameter. The fine wire can have a thickness $D_f$ of 0.005 to 0.1 mm or more, the upper limit being determined by impaired visibility. The distance S between turns of the wire spiral 2 can be greater or smaller than in the embodiment shown, but should not fall below one turn diameter $D_w$. The distance, a, between adjacent parallel spirals 2 is 0.9 mm in this embodiment. It may vary from 0.1 to 4.0 mm according to requirements.

Figure 2:
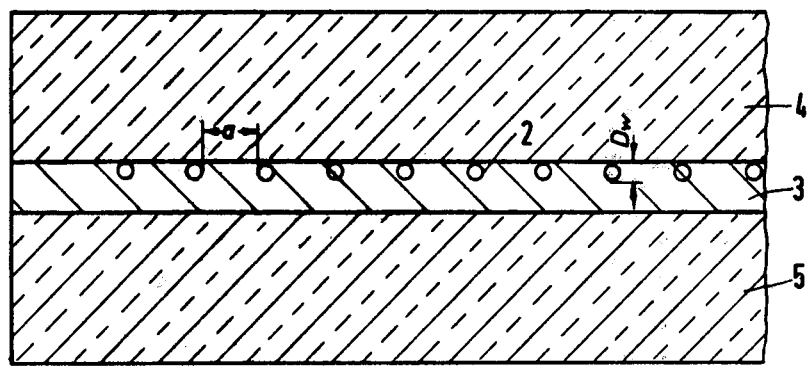
FIG. 2 is a sectional elevation through the same heated pane portion.

FIG. 2 shows the same pane portion as in FIG. 1, but in sectional elevation viewing in the direction of the wire spiral axes. The heating wire spirals 2 of circular appearance are embedded in a suitable thermoplastic film 3, for example polyvinybutyral film having a thickness of 0.76 mm, to the extent that each individual wire turn lies locally against the inner side of an exterior cover pane 4, in order to improve heat transfer. The diameter $D_w$ of the wire spiral 2, at 0.3 mm, is equal in this case to only a fraction of the film thickness. The wire spirals 2 when embedded may be of round oblate or flat form when viewed in the axial direction. The diameter D of the wire spirals can however be equal to or slightly greater than the thickness of the intermediate film 3. In such cases, each individual turn of the spirals 2 should lie locally against the opposing inner surfaces of both of the cover panes 4 and 5, in order to provide a greater heat distribution, if required.

Figure 3:
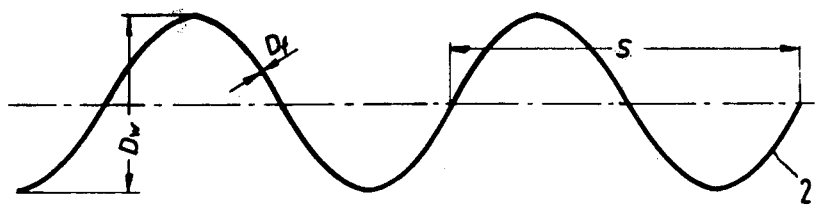
FIG. 3 shows a wire spiral extended parallel to its axis to about two turn diameters, and magnified about one hundred times.

FIG. 3 is an elevational view, magnified about one hundred times, of a few turns of a wire spiral 2 similar to the wire spirals shown in FIGS. 1 and 2. The spiral turns appear as sinusoidal curves. This appearance would also be the same in plan view. The single wire strand used for the spiral has in this case a diameter $D_f$ of 0.01 mm. Wire spirals of several single strands twisted together would have the same appearance. Their distance S between turns is $2D_w$.

Figure 4:
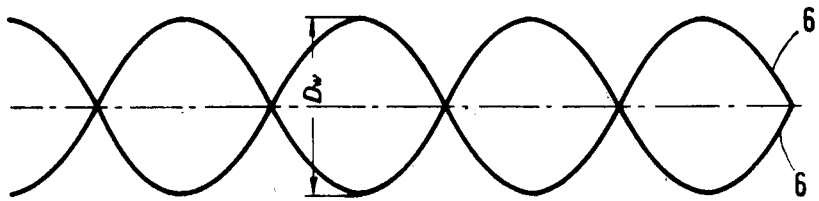
FIG. 4 shows a wire spiral of the same extension and size as in FIG. 3, but consisting of two separate spiral wires extending parallel to each other and spaced apart.

FIG. 4 shows a few turn of two wire spirals 6 analogous to the one shown in FIG. 3, each with a spiral diameter of $D_w$, and a distance S between turns of $2D_w$.

The present invention has the advantage over the prior art of providing a new type of arrangement for the wire insert of heated panes, which reduces the appearance of diffraction and prevents optical distortion, in a new manner. This is attained in that the thin heating wires are no longer disposed in changing direction in a single plane, but instead are disposed in the form of three-dimensional elongated spirals, by which the possibility of interference is considerably reduced. At the same time, because of the spiral arrangement of the heating wires, they are more difficult to see, so that even heating wires having a diameter exceeding 0.02 mm can be used.

The invention is not limited to heated panes; it can be advantageously used wherever a wire insert should not be visible, such as for alarm panes, screening or antennae.

We claim:

1. A laminated transparent pane comprising at least two laminations and an intermediate film between the laminations, said laminations and said film being electrically non-conductive, a plurality of electrical heating wires, each in the form of a three dimensional spiral, embedded in the intermediate film, said heating wires each comprising several individual wires which are helically wound about the same axis but are offset axially with respect to one another, and electrical connection means mounted near the edge of said pane and connected to each of said wires, said wires being disposed and configured so that they do not interfere with vision through said pane.

2. The pane of claim 1, wherein each spiral has a spiral axis, and all the spiral axes lie parallel to the plane of the pane so that the wires appear to lie in a single plane when viewed through the pane.

3. The pane of claim 1, wherein each individual turn of the wires is in contact with an inner side of one of the exterior laminations.

4. The pane of claim 1, wherein the diameters of the wire spirals are not greater than the thickness of the intermediate film.

5. The pane of claim 1, wherein the wires are arranged with their spiral axes parallel to one another and wherein the spiral turns about said axes are spaced apart from one another a distance of from 0.1 to 4 mm.

6. The pane of claim 1, wherein the distance, measured along the spiral axis, between adjacent turns of each spiral is at least equal to the diameter of the spiral.

7. The pane of claim 1, wherein the wires have a thickness of 0.005 to 0.5 mm.

8. The pane of claim 1, wherein the wires each consist of a single wire strand.

9. The pane of claim 1, wherein the wires each consist of several strands twisted together to form stranded wire.

* * * * *